United States Patent
Aoki et al.

(10) Patent No.: US 6,443,123 B1
(45) Date of Patent: Sep. 3, 2002

(54) FUEL INJECTION APPARATUS USED FOR CYLINDER DIRECT INJECTION TWO CYCLE INTERNAL COMBUSTION ENGINE AND METHOD OF CONTROLLING THE SAME

(75) Inventors: Narutoshi Aoki; Tsuneaki Endou; Jun Kawagoe, all of Numazu (JP)

(73) Assignee: Kokusan Denki Co., Ltd., Shizuoka-ken (JP)

( * ) Notice: Subject to any disclaimer, the term of this patent is extended or adjusted under 35 U.S.C. 154(b) by 0 days.

(21) Appl. No.: 09/699,620

(22) Filed: Oct. 30, 2000

(30) Foreign Application Priority Data

Nov. 2, 1999 (JP) .......................................... 11-312685

(51) Int. Cl.$^7$ ................................................ F02B 5/00
(52) U.S. Cl. ...................................... 123/305; 123/73 C
(58) Field of Search ........................ 123/73 C, 73 CA, 123/73 B, 73 BA, 295, 305, 430, 689

(56) References Cited

U.S. PATENT DOCUMENTS

| 4,986,242 A | 1/1991 | Bonfiglioli et al. ....... 123/73 A |
| 5,259,344 A | * 11/1993 | Huang et al. ............. 123/73 C |
| 5,441,030 A | 8/1995 | Satsukawa ................... 123/479 |
| 5,901,673 A | * 5/1999 | Ishikawa ................... 123/73 B |

FOREIGN PATENT DOCUMENTS

| JP | 3047633 | 3/2000 |

* cited by examiner

Primary Examiner—Willis R. Wolfe
Assistant Examiner—Mahmoud Gimie
(74) Attorney, Agent, or Firm—Pearne & Gordon LLP

(57) ABSTRACT

A method of controlling a fuel injection apparatus for a cylinder direct injection type two cycle internal combustion engine comprising the steps of detecting a scavenging temperature by a scavenging temperature detector provided in a scavenging passage of the cylinder direct injection type two cycle internal combustion engine and determining a practical injection time by arithmetically operating a correction value of the injection time relative to the detected scavenging temperature and multiplying a reference injection time by the correction value.

2 Claims, 10 Drawing Sheets

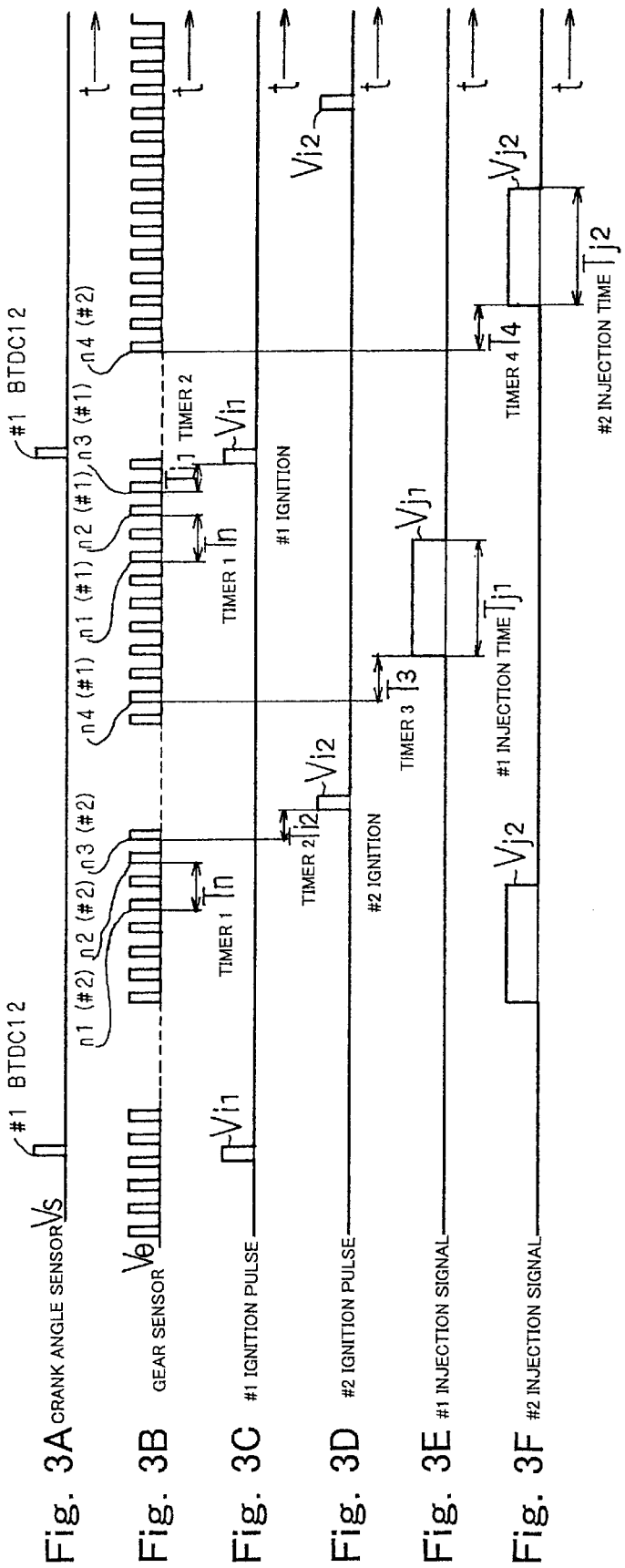

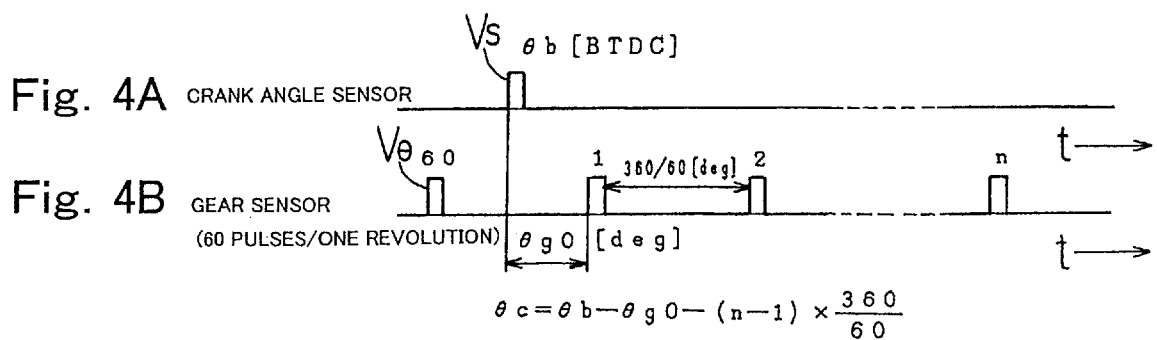
Fig. 4A CRANK ANGLE SENSOR
Fig. 4B GEAR SENSOR (60 PULSES/ONE REVOLUTION)
$$\theta c = \theta b - \theta g 0 - (n-1) \times \frac{360}{60}$$
Fig. 5
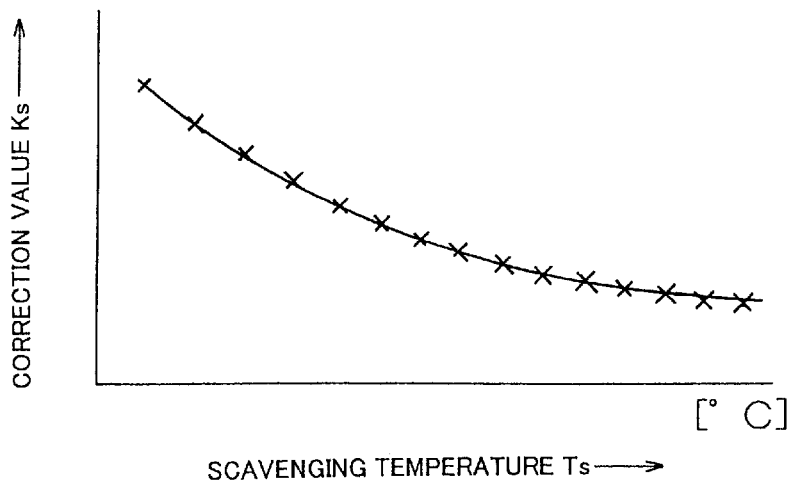

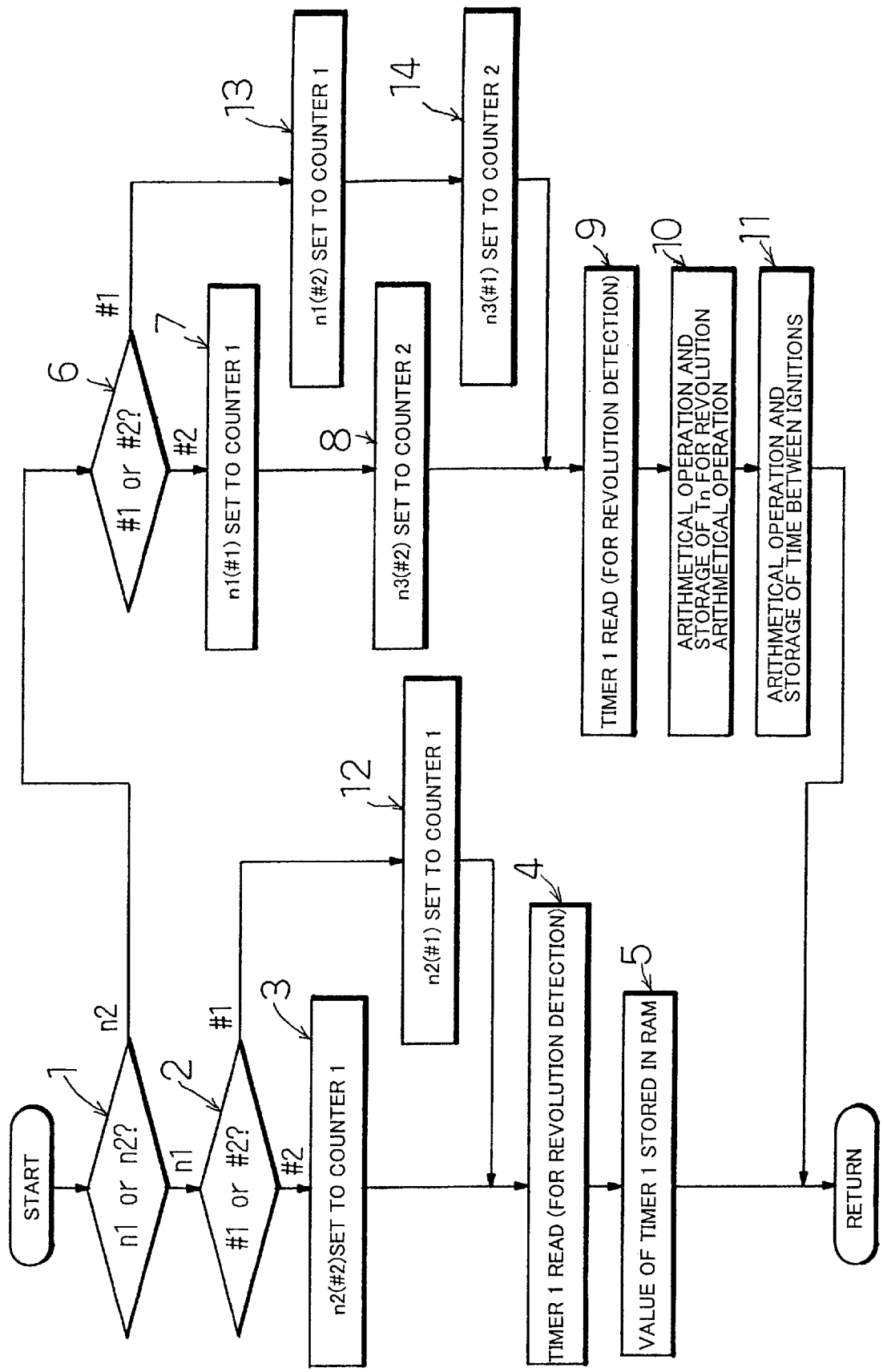

FUEL INJECTION APPARATUS USED FOR CYLINDER DIRECT INJECTION TWO CYCLE INTERNAL COMBUSTION ENGINE AND METHOD OF CONTROLLING THE SAME

TECHNICAL FIELD OF THE INVENTION

This invention pertains to a fuel injection apparatus used for a cylinder direct injection two cycle internal combustion engine which is adapted to inject a fuel from an injector directly into a cylinder of the two cycle internal combustion engine and a method of controlling the fuel injection apparatus.

BACKGROUND OF THE INVENTION

A fuel injection apparatus for a cylinder direct injection two cycle internal combustion engine which is adapted to inject a fuel directly into a cylinder comprises an injector provided so as to inject a fuel into a cylinder ( a combustion chamber) of the engine, a high pressure fuel pump to supply the fuel to a fuel supply port of the injector, a pressure regulator to control a pressure of the fuel (a fuel pressure) applied from the fuel pump to the injector so as to keep it a controlled value, an electronic control unit (ECU) to control the injector, signal generation means to provide a revolution information of the engine, revolution detection means to detect a revolution of the engine, throttle valve opening degree detection means to detect an opening degree of a throttle valve of the engine and various sensors to detect various control conditions including an atmospheric pressure, a cooling water temperature and an intake air temperature which are other than the revolution and the opening degree of the throttle valve and apply them to the ECU.

The ECU comprises a CPU which accomplishes reference injection time arithmetical operation means to arithmetically operate a reference injection time which is to be used for a basis for determining a time during which the fuel is injected from the injector relative to the revolution of the engine and the opening degree of the throttle valve, correction value arithmetical operation means to arithmetically operate correction values by which the reference injection time is to be multiplied in accordance with the respective control conditions detected by the various sensors in order to correct the injection time relative to the control conditions and practical injection time arithmetical operation means to arithmetically operate a practical injection time by multiplying the reference injection time by the thus arithmetically operated corrections value whereby a drive current is supplied to the injector so as to inject the fuel during the thus determined practical injection time.

The ECU also serves to control an ignition system for the internal combustion engine relative to various control conditions such as the revolution of the internal combustion engine and so on.

The injector may be in the form of an electromagnetic fuel injection valve comprising an injector body having a fuel supply port through which the fuel is supplied from the fuel pump and a fuel injection port, a valve to open or close the fuel injection port of the injection body and a solenoid to drive the valve. The injector opens the valve to inject the fuel while a predetermined drive current flows through a coil of the solenoid from the ECU.

In such a fuel injection apparatus as aforementioned, the amount of the fuel to be supplied to the engine is determined by the product of the fuel pressure applied to the injector and the fuel injection time, but since variation in both of the fuel pressure and the fuel injection time makes the control complicated, in general, the fuel pressure applied to the injector when the engine is normally operated is so controlled as to be kept at a desired objective value set within the range of 7 to 9 MPa and the CPU controls only the fuel injection time to thereby control the amount of the fuel to be supplied to the engine.

Also, the ECU controls the injector so as to stop driving the injector to stop the fuel from being supplied when a stop instruction is given, also stop driving the fuel pump and furthermore stop the operation of the ignition system to ignite the engine whereby the engine is stopped.

In the prior art two cycle internal combustion engine having the injector mounted on a throttle body, the injector is disposed in front of the throttle valve so that the fuel is injected from the injector toward a crankcase. The thus injected fuel and air flowing through the throttle body are introduced into the crankcase so that they are combined with each other within the crankcase.

In this two cycle engine, the heat of the crankcase is lost due to evaporation heat generated when the fuel and the air are combined within the crankcase. Furthermore, since the crankcase is cooled by the cooling water circulating through the cooling water passage formed in a housing of the crankcase, the temperature of the crankcase is restrained from rising. In such a two cycle engine as the fuel and the air are combined with each other in the crankcase, the crankcase is kept at a temperature substantially identical to the cooling water temperature due to the evaporation heat of the fuel and the cooling water.

As aforementioned, in case that the fuel and the air are combined with each other in the crankcase, the temperature of the engine is substantially identical to that of the cooling water and therefore the amount of fresh air flowing through the scavenging passage into the combustion chamber can be accurately supposed by estimating an air density of the interior of the crankcase from the atmospheric pressure, the cooling water temperature and the intake air temperature.

Thus, the fuel injection time required for obtaining a mixture gas of appropriate air to fuel ratio can be determined by multiplying the reference injection time determined relative to the revolution of the engine and the throttle valve opening degree by the correction values determined relative to the atmospheric pressure, the cooling water temperature and the intake air temperature. This enables to obtain the combustion state always most suitable for variation in the operation conditions such as the revolution and the loads and the environment conditions such as the atmospheric pressure, the cooling water temperature, the intake air temperature and so on.

On the other hand, in case that the fuel is injected directly into the cylinder, since the fuel is never evaporated in the crankcase and therefore the temperature of the crankcase is never lowered due to the evaporation heat of the fuel, the temperature of the crankcase sometimes gets higher than the cooling water temperature. This sometimes disturbs the amount or density of the air flowing through the scavenging passage into the combustion chamber from being estimated from the atmospheric pressure, the cooling water temperature and the intake air temperature.

Thus, it will be noted that in the cylinder direct injection type two cycle internal combustion engine, the appropriate injection time cannot sometimes be determined only by correcting the injection time relative to the atmospheric pressure, the cooling water temperature and the intake air temperature, and therefore, the appropriate combustion cannot be always made relative to the operation state and the environment conditions.

SUMMARY OF THE INVENTION

Accordingly, it is a principal object of the invention to provide a method of controlling a cylinder direct injection type two cylinder internal combustion engine adapted to always make an appropriate combustion in spite of variation in the operation states and the environment conditions.

It is another object of the invention to provide a cylinder direct injection type two cylinder internal combustion engine adapted to always make an appropriate combustion in spite of variation in the operation states and the environment conditions.

In accordance with one aspect of the present invention, there is provided a method of controlling a fuel injection apparatus for a cylinder direct injection type two cycle internal combustion engine comprising the step of arithmetically operating an injection time of the fuel injection apparatus in accordance with various control conditions whereby the fuel injection apparatus is so controlled that a fuel is injected during said injection time determined by said arithmetical operation, the method further comprising the steps of detecting a scavenging temperature of the two cycle internal combustion engine (an air temperature in the scavenging passage) and arithmetically operating the injection time while also using the detected scavenging temperature as another control condition.

Normally, when the injection time should be arithmetically operated, a reference injection time which is used for a basis for determining a time during which the fuel is injected from the fuel injection apparatus is determined by being arithmetically operated relative to a revolution of the internal combustion engine and an opening degree of a throttle valve and an practical injection time is determined by multiplying the reference injection time by correction values which are in turn determined by being arithmetically operated relative to the control conditions such as the atmospheric pressure, the cooling water temperature, the intake air temperature and so on which are other than the revolution of the engine and the opening degree of the throttle valve.

In case that the practical injection time is arithmetically operated by this method, the practical injection time is determined by multiplying the reference injection time by a correction value determined relative to the scavenging temperature as well as the correction values determined relative to the other control conditions.

In accordance with another aspect of the invention, there is provided a fuel injection apparatus for cylinder direct injection two cycle internal combustion engine comprising an injector provided so as to directly inject a fuel into a cylinder of the two cycle internal combustion engine, a fuel pump to supply the fuel to the injector, a pressure regulator to control a fuel pressure applied from the fuel pump to the injector so as to keep it a controlled value, a control unit to control the injector so as to inject the fuel during the injection time determined by being arithmetically operated in accordance with the various control conditions and a scavenging temperature detector to detect a scavenging temperature of the two cycle internal combustion engine, the control unit being so constructed to arithmetically operate the injection time while also using the detected scavenging temperature as another control condition.

In many cases, the control unit of the fuel injection apparatus for cylinder direct injection type two cycle internal combustion engine may have revolution detection means to detect a revolution of the internal combustion engine, throttle opening degree detection means to detect an opening degree of a throttle valve of the internal combustion engine, various sensors to detect various control conditions including at least an atmospheric pressure, a cooling water temperature and ah intake air temperature which are other than the revolution of the engine and the opening degree of the throttle valve, reference injection time arithmetical operation means to arithmetically operate a reference injection time which is to be used for a basis for determining a time during which a fuel is injected from the injector relative to the revolution of the engine and the opening degree of the throttle valve, correction value arithmetical operation means to arithmetically operate correction values by which the reference injection time is to be multiplied in accordance with the respective control conditions detected by the various sensors in order to correct the injection time relative to the control conditions and practical injection time arithmetical operation means to arithmetically operate a practical injection time by multiplying the reference injection time by the correction value arithmetically operated by the correction values arithmetical operation in accordance with the control conditions whereby the injector is so controlled as to inject the fuel during the thus determined practical injection time.

In such a fuel injection apparatus to which the invention should be applied, a scavenging temperature detector may be provided to detect a scavenging temperature of the two cycle internal combustion engine and the correction value arithmetical operation means is so constructed as to arithmetically operate the injection time while also using the detected scavenging temperature as additional control condition.

With the injection time adapted to be corrected additionally in accordance with the scavenging temperature detected by the scavenging temperature detector, since the density or amount of the air supplied through the scavenging passage into the combustion chamber can be accurately estimated, the injection time or the amount of fuel injection required for obtaining the mixture gas of proper air to fuel ratio within the combustion chamber can be accurately determined.

Thus, according to the invention, the mixture gas of proper air to fuel ratio in accordance with variation in the operation states and the environment conditions can be always obtained and therefore an appropriate combustion can be accomplished, which causes the property of the engine to be improved.

The scavenging temperature detector may preferably comprises a temperature sensor provided so as to detect a temperature in a scavenging passage of the two cycle internal combustion engine at a position closer to a crankcase.

BRIEF DESCRIPTION OF THE DRAWINGS

The above and other objects and features of the invention will be apparent from the detailed description of the preferred embodiments of the invention, which is described and illustrated with reference to the accompanying drawings, in which;

FIGS. 3A through 3F show time charts illustrating an operation of the fuel injection apparatus of FIG. 1;

FIGS. 4A and 4B show time charts illustrating a method of arithmetically operating a revolution of the engine and so on in the fuel injection apparatus of the invention;

FIG. 5 shows a curve illustrating an example of a relation of a scavenging temperature correction value for an injection time and a scavenging temperature;

FIG. 8 shows a flowchart illustrating an algorithm of an interruption routine practiced when a revolution detection counter counts predetermined revolution detection pulses;

DETAILED DESCRIPTION OF PREFERRED EMBODIMENTS

Figure 1:
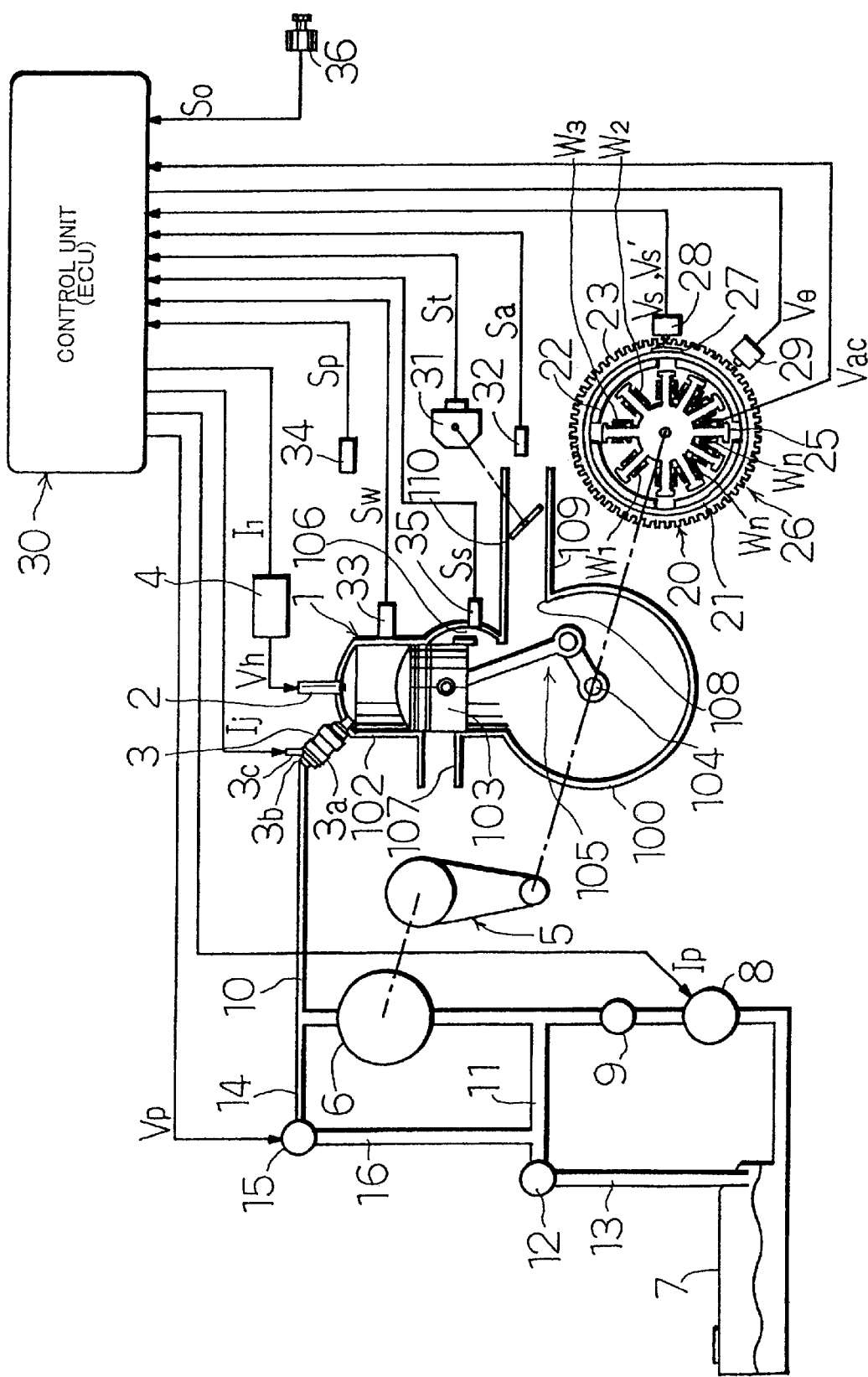
FIG. 1 is a schematic diagram of a fuel injection apparatus for a cylinder direct injection type internal combustion engine constructed in accordance with an embodiment of the invention.

Referring now to FIG. 1, there is shown a fuel injection apparatus for a cylinder direct injection type internal combustion engine 1 constructed in accordance with an embodiment of the invention. The internal combustion engine 1 comprises a crankcase 100, a cylinder 102 connected to the crankcase 100, a piston 103 engaging an inner peripheral face of the cylinder 102 in a sliding manner, a crank shaft 104 supported in the crankcase 100 and a crank mechanism 105 to connect the crank shaft 104 and the piston 103. A scavenging passage 106 is provided so as to communicate the inner space of the crankcase 100 with the inner space of the cylinder 102 and an exhaust pipe not shown is connected to an exhaust port 107 of the cylinder 102. A throttle body 109 is connected to an intake port 108 provided in the crankcase 100 and a throttle valve 110 is provided in the throttle body 109.

An ignition plug 2 and an injector 3 are provided on the cylinder 102. An igniting high voltage "Vh" is applied across the ignition plug 2 from an ignition coil 4.

In the illustrated embodiment, the internal combustion engine may have two cylinders, for each of which the ignition plug 2 and the injector 3 are provided.

A drive shaft of a high pressure fuel pump 6 may be connected through a reduction gear mechanism 5 such as a chain-sprocket mechanism to the crank shaft 104. A fuel is supplied from the fuel pump 6 through a low pressure fuel pump 8 and a filter 9 to an intake port 6 of the high pressure fuel pump 6.

The low pressure fuel pump 8 may be in the form of an electric motor pump driven by a DC voltage obtained by rectifying an output of a magneto generator which will be described later and the fuel within a fuel tank 7 is supplied to the high pressure fuel pump 6 under predetermined outlet pressure. The high pressure pump 6 may be in the form of a pump rotatively driven by the internal combustion engine 1 and serves to supply the fuel to the injector 3 under a further rising pressure of 7 to 9 [MPa] which is higher than the pressure under which the low pressure fuel pump 8 supplies the fuel.

The injector 3 may comprise a valve body 3a having an injection port at its leading end and containing a valve to open or close the injection port, a spring to urge the valve toward the closed position and a solenoid coil to drive the valve toward the open position. A fuel connector 3b provided at the rear end of the valve body 3a is connected through a fuel supply conduit 10 to the supply port of the high pressure fuel pump 6.

At the rear end of the valve body 3a is provided an electric connector 3c through which a drive current is supplied from a controller described later to the solenoid coil of the injector 3.

The injector 3 opens the valve to start injecting the fuel when the drive current of more than predetermined level is applied to the solenoid coil and continues to open the valve to inject the fuel while the holding current of predetermined level is applied to the solenoid coil. The amount of the fuel injected from the injector 3 is determined on the product of the fuel pressure applied to the injector 3 and the time for which the fuel is injected (the fuel injection time).

A low pressure regulator 12 is connected through a conduit 11 to a pipe passage that connects the filter 9 and the inlet port of the high pressure pump 6 with each other. The low pressure regulator 12 serves to control the high pressure fuel pump 6 so as to keep the fuel pressure in the high pressure fuel pump 6 substantially at a constant controlled value by returning a portion of the fuel in the conduit 11 through a return pipe 13 to the fuel tank 7 when the pressure within the conduit 11 exceeds a set value.

A high pressure regulator 15 is connected through a conduit 14 to an outlet port of the high pressure fuel pump 6. The high pressure regulator 15 serves to control the high pressure fuel pump 6 so as to keep the outlet pressure of the high pressure fuel pump 6 (the fuel pressure applied to the injector 3) at a controlled value ranging from 7 to 9 MPa by returning a portion of the fuel in the conduit 14 through a return pipe 16 to the conduit 11 when the pressure within the conduit 14 (the fuel pressure applied to the injector 3) exceeds a set value.

The high pressure regulator 15 may have a solenoid to adjust a cross section of the fuel flow passage (the return pipe 16) through which the fuel is returned. This may be accomplished by applying to the solenoid a control signal "Vp" applied from an electronic control unit (ECU) which will be described later to adjust the return flow quantity of the fuel so that the fuel pressure applied to the injector 3 can be adjusted.

A flywheel magnet rotor 20 is mounted on the crank shaft 104 of the internal combustion engine 1. The flywheel magnet rotor 20 may comprise a flywheel 21 formed of cup-shaped ferromagnetic materials such as iron and a magnet field which may be formed by mounting a permanent magnet 22 on an inner peripheral face of the flywheel 21. A ring gear 23 having 60 teeth is mounted on an outer periphery of the flywheel 21. A stator 25 is disposed inside the flywheel magnet rotor 20. The magnet rotor 20 and the stator 25 form the conventional magneto generator 26. The ring gear 23 is used for meshing with a pinion gear driven by a starter motor when the engine starts to rotate the crank shaft of the internal combustion engine.

In the illustrated embodiment, the stator 25 may comprise coils wound on radial salient poles extending from an annular yoke of star shaped annular armature core, respectively.

The three salient poles among the salient poles of the stator 25 may be provided at an angle distance of 45 degree and the two coils W1 and W2 wound on two of these three salient poles are connected in series to each other to form a low speed exciting coil and another coil W3 wound on the rest salient pole forms a high speed exciting coil.

The low speed exciting coil has a large number of turns set so as to apply an enough high drive voltage to the ignition system for the internal combustion engine when the engine rotates at a low speed and the high speed exciting coil has a small number of turns set so as to apply an enough high drive voltage to the ignition system for the internal combustion engine when the engine rotates at a high speed.

The remaining salient poles of the stator 25 are disposed at an angle distance of 30 degree corresponding to the polar distance of a conventional twelve pole core and have armature coils Wn wound thereon to drive electric car devices other than the ignition system.

The reluctors 27 of arc-like protrusion are provided on the outer peripheral wall of the flywheel 21. A crank angle sensor 28 to detect the reluctors 27 to generate pulse signals and a gear sensor 29 to detect the teeth of the ring gear 23 to generate pulse signals are disposed outside of the magnet rotor 20.

The crank angle sensor 28 may be in the form of a conventional generator, which may comprise a core having a magnetic pole provided at its leading edge in a manner faced to the reluctors 27, a pulser coil wound on the core and a permanent magnet magnetically bonded with the core. The crank angle sensor 28 may be provided on a sensor mount of an engine case or the like. This sensor 28 generates pulse signals Vs and Vs' of different polarities from the pulser coil thereof when it detects the front and rear edges of the reluctors 27 as viewed from the rotational direction thereof, respectively.

In the illustrated embodiment, the position where the crank angle sensor 28 is mounted and an arc length of the reluctors 27 are so set that the crank angle sensor 28 detects the front edge of the reluctors 27 as viewed from the rotational direction at a position advanced by an angle 12 degree relative to the rotary angle position of the crank shaft when the piston of the first cylinder of the internal combustion engine reaches a top dead center (referred to as "top dead center position of the first cylinder" hereinafter) to detect the voltage Vs. The pulse signal Vs is used as a reference pulse to decide the cylinder of the engine.

The gear sensor 29 may be constructed in the same manner as the crank angle sensor 28 and securely provided on the sensor mount. The gear sensor 29 generates pulse signals of different polarities when it detects the front and rear edges of the teeth of the ring gear 23 as viewed from the rotational direction thereof, respectively. The pulses of one polarity among the pulses of different polarities generated when it detects each of the teeth of the ring gear 23 is used as a rotation detection pulse $V\theta$ which serves to detect a rotary angle of the crank shaft of the engine. In the illustrated embodiment, the rotation detection pulses are generated at an angle of 6 degree so that 60 pulses are generated for one revolution of the crank shaft. In the illustrated internal combustion engine, the rotation detection pulses $V\theta$ output by the gear sensor 29 begin to be counted from the time when the crank angle sensor 28 generates the reference pulse Vs to detect the reference position where the ignition positions of the respective cylinders and the start position of the fuel injection begin to be measured.

The AC voltage Vac generated by the armature coil of the stator 25 of the magneto generator 26 for driving the electric car devices, the reference pulses Vs and Vs' generated by the crank angle sensor 28 and the rotation detection pulses $V\theta$ generated by the gear sensor 29 are input to the electronic control unit (ECU) 30.

To the ECU 30 are also input an output signal St of a throttle opening degree sensor 31 to detect an opening degree of the throttle valve 110, an output signal Sa of an intake air temperature sensor 32 to detect an intake air temperature of the engine, an output signal Sw of a cooling water temperature sensor 33 to detect a temperature of a cooling water for the engine, an output signal Sp of an atmospheric pressure sensor 34 to detect an atmospheric pressure and a scavenging temperature detection signal Ss output by a scavenging temperature detector 35. The scavenging temperature detector 35 may comprise a temperature sensor provided in a manner faced to a mounting hole provided in a portion of the outer wall of the scavenging passage 106 closer to the crankcase 100. The scavenging temperature detector 35 serves to detect the air temperature at the portion of the scavenging passage 106 closer to the crankcase to output as the scavenging temperature detection signal Ss an electric signal of level proportional to the detected temperature.

A stop switch 36 operated when the engine stops is connected also to the ECU 30. When the stop switch 36 is operated, a stop instruction signal So is applied to the ECU 30.

Figure 2:
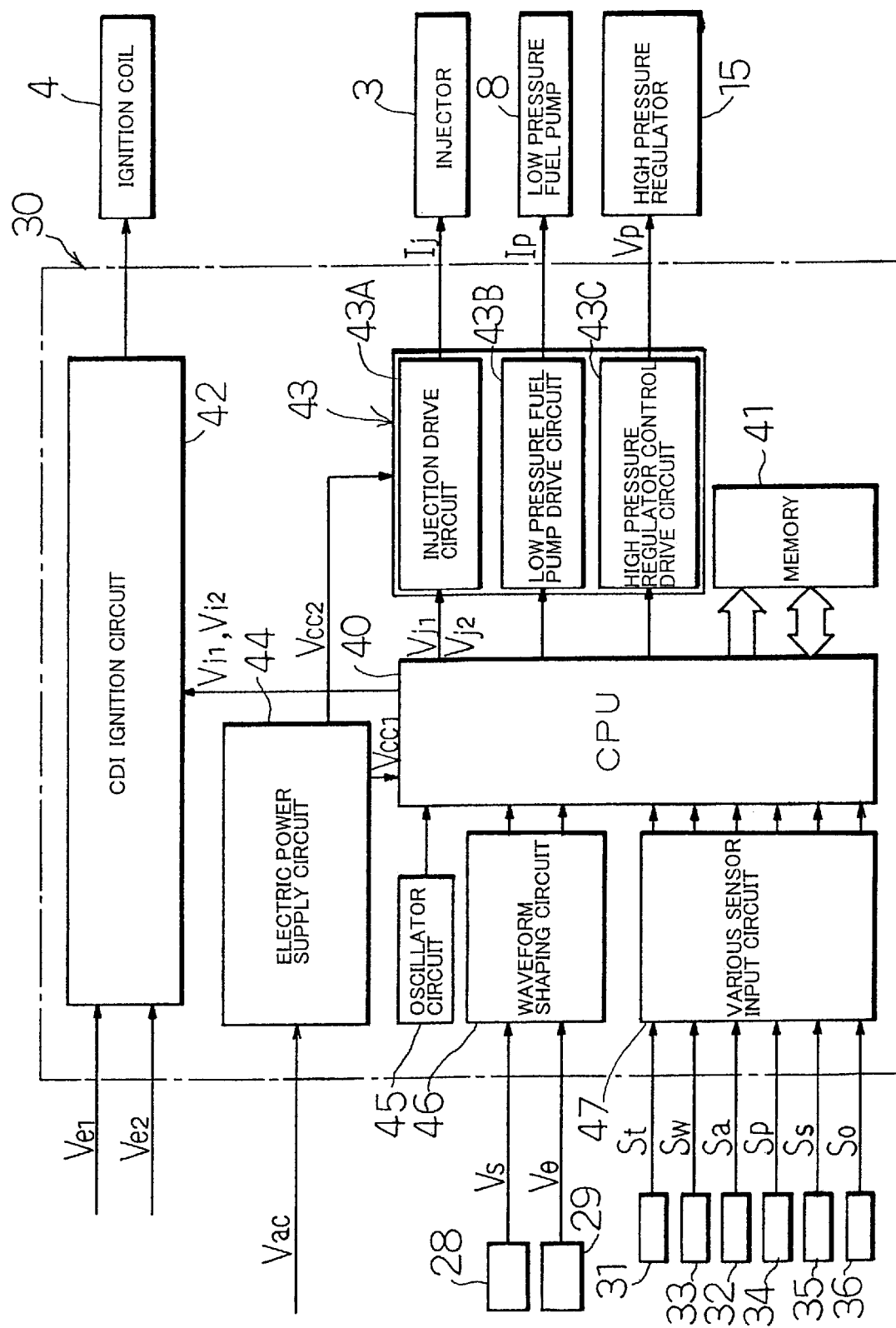
FIG. 2 illustrates an example of an ECU used in the fuel injection apparatus of FIG. 1.

FIG. 2 shows an embodiment of the construction of the ECU 30. The illustrated ECU 30 may comprise a CPU 40, a memory (ROM) 41 to store a program to be practiced by the CPU and the characteristic data thereof, a capacitor discharging type ignition circuit (CDI ignition circuit) 42, a drive circuit section 43, an electric power supply circuit 44, an oscillator circuit 45 to apply clock pulses to the CPU 40, a waveform shaping circuit 46 to shape the reference pulses Vs generated by the crank angle sensor 28 and the rotation detection pulses generated by the gear sensor 29 into signals of waveform which can be recognized by the CPU 40, an input circuit (an interface circuit) 47 for various sensors to input the throttle opening degree detection signal St generated by the throttle opening degree sensor 31, the cooling water temperature detection signal Sw generated by the cooling water temperature sensor 33, the intake air temperature detection signal Sa generated by the intake air temperature sensor 32, the atmospheric pressure detection signal Sp generated by the atmospheric pressure sensor 34, the scavenging temperature detection signal Ss generated by the scavenging temperature detector 35 and the stop instruction signal So generated by the stop switch 36 after they are converted into the waveforms which can be recognized by the CPU 40, a revolution detection timer to detect the revolution of the engine, an ignition position control timer to measure the ignition position obtained by the arithmetical operation, a first cylinder injection control timer to measure the injection start position of the first cylinder, a second cylinder injection control timer to measure the injection start position of the second cylinder, a revolution detection gear sensor counter, an ignition position control gear sensor counter, a first cylinder injection start position control gear sensor and a second cylinder injection start position control gear sensor (the timers and the counters not shown in FIGS. 1 and 2).

The CDI ignition circuit 42 may comprise an igniting capacitor provided on a primary side of an ignition coil 4, a charge circuit to charge the igniting capacitor with one of the polarities as an electric power supply of an exciting coil provided in the magneto generator 26 and a discharging switch adapted to be electrically conducted when an ignition pulse Vi1 or Vi2 is applied from the CPU 40 to discharge the charge of the igniting capacitor through the primary coil of the ignition coil 4. An igniting high voltage is induced across a secondary coil of the ignition coil 4 by discharging the igniting capacitor. The CDI ignition circuit 42 is provided for each of the cylinders and when the ignition pulse Vi1 or Vi2 is applied to the ignition circuit for each of the cylinders from the CPU, the igniting high voltage is induced across the secondary coil of the ignition coil 4 for the corresponding cylinder to thereby generate a spark discharge across the ignition coil for the corresponding cylinder whereby the cylinder is ignited.

In such an ignition circuit, since the igniting capacitor should be charged with the high voltage of more than 200[V] even when the engine rotates at low speed or at high speed, there are required to be provided a low speed exciting coil of a large number of turns used for the electric power supply to output the high voltage Ve1 at the low speed of the engine and a high speed exciting coil of a small number of turns to output the high voltage Ve2 at the high speed of the engine. The igniting capacitor is adapted to be charged with the higher voltage of the two voltages Ve1 and Ve2 output from the exciting coils. Since the thus constructed ignition circuit is well known, the detailed explanation thereof will be omitted.

The drive circuit section 43 may comprise an injector drive circuit 43A to supply a drive current Ij to the solenoid coil of the injector 3 in accordance with the injection signal Vj1 or Vj2 applied from the CPU 40, a low pressure fuel pump drive circuit 43B to supply a drive current to the low pressure fuel pump 8 in accordance with the instruction from the CPU 40 and a high pressure regulator control drive circuit 43C to apply a control signal Vp to the return flow regulating solenoid of the high pressure regulator 15 in accordance with the instruction from the CPU 40.

The electric power supply circuit 44 may comprise a rectifier to rectify the AC voltage Vac output by the stator 25 of the magneto generator 26 and a voltage control circuit to control the output voltage of the rectifier so as to be kept at less than a predetermined value to convert the AC voltage Vac into DC voltages of constant value Vcc1 and Vcc2, which are in turn applied to electric power terminals of the CPU 40 and the drive circuit section 43, respectively.

The electric power supply circuit 44 may alternatively comprise a common armature coil of the magneto generator to generate the DC voltages Vcc1 and Vcc2 or separate armature coils to generate the DC voltages Vcc1 and Vcc2, respectively. Also, the DC voltage to drive the injector 3 and the voltage to drive the low pressure fuel pump 8 may be obtained from separate armature coils.

The CPU 40 provided in the ECU 30 may have the revolution detection timer to detect a time Tn required for the gear sensor 29 to generate revolution detection pulses of predetermined number (a time required for the crank shaft 104 of the engine to rotate by an angle of 12 degree in the embodiment) from which the revolution of the crank shaft 104 of the engine is detected or arithmetically operated. The revolution may be detected just once per one revolution of the engine or otherwise plural times per one revolution of the engine. In the illustrated embodiment, the revolution of the crank shaft is detected before the first cylinder is ignited and before the second cylinder is ignited, respectively.

The CPU 40 estimates the operation state of the engine from the throttle opening degree detected by the throttle opening degree sensor 31, the cooling water temperature detected by the cooling water temperature sensor 33, the intake air temperature detected by the intake air temperature sensor 32, the atmospheric pressure detected by the atmospheric pressure sensor 34 and the scavenging temperature (the air temperature within the scavenging passage) detected by the scavenging temperature detector 35, arithmetically operates the injection start position of the injector for the respective cylinders (the rotary angle position of the crank shaft where the valve of the injector is opened) and the injection time (a time during which the valve of the injector is being opened) so that a proper amount of the fuel is injected from the injector at a time suitable for the operation state of the engine and arithmetically operates the ignition position for the respective cylinders so that the engine is ignited at a position suitable for the operation state of the engine.

The CPU 40 also counts by means of the crank angle sensor 28 the revolution detection pulses Vθ generated by the gear sensor 29 from the time when the reference pulse Vs is generated and thereby detects the injection reference position where the injection start position of the injector for the respective cylinders begins to be measured and the ignition reference position where the ignition position of the respective cylinders begins to be measured.

When the injection reference position for the respective cylinders is detected, the injection start position of the injector for the respective cylinders which is arithmetically operated by the CPU begins to be measured and when the injection start position of the injector for the respective cylinders is detected, the injection signal is applied to the injector drive circuit 43A so that the valve of the injector is opened during the injection time obtained by the arithmetical operation. Thus, the drive current is applied from the drive circuit 43A to the injector 3 for the respective cylinders to inject the fuel into the corresponding cylinder.

The CPU 40 also starts to measure the ignition position of the respective cylinders obtained by the arithmetical operation after the ignition reference position for the respective cylinders is detected and applies the ignition pulse Vi1 or Vi2 to the CDI ignition circuit for the respective cylinders when the ignition position for the respective cylinders is detected to ignite the corresponding cylinder.

FIG. 3 shows a time chart which indicates the reference pulses Vs generated by the crank angle sensor 28 of the internal combustion engine, the revolution detection pulses Vθ generated by the gear sensor 29, the ignition pulses Vi1 and Vi2 for the first and second cylinders applied to the CDI ignition circuits for the first and second cylinders by the CPU and the injection signals for the first and second cylinders applied to the injector drive circuits for the first and second cylinders by the CPU relative to the time t.

In FIG. 3, codes #1 and #2 designate the first and second cylinders of the internal combustion engine, respectively and the signals or the matters to which the codes #1 and #2 are attached means ones for the first and second cylinders, respectively.

"BTDC12" means the rotary angle position of 12 degree prior to the top dead center (TDC) of the engine and the code "1BTDC12" attached to the reference pulses Vs output by the crank angle sensor 28 means that the reference pulses Vs are generated at a position advanced by an angle of 12 degree relative to the top dean center of the first cylinder. Thus, it will be noted that "BTDC" in the specification means the rotary angle of the crank shaft measured toward the advanced side relative to a reference position of the top dead center of the engine.

In FIG. 3B, "n1", "n2", . . . indicate a count number of the output pulses of the gear sensor 29 when the output pulses of the gear sensor 29 starts to be counted from the time when the crank angle sensor 28 generates the reference pulse Vs. The codes "n1(#1)", "n2(#1)" . . . indicate the count value for the first cylinder while the codes "n1(#2)", "n2(#2)". . . indicate the count value for the second cylinder.

The codes "n1(#1)" and "n2(#1)" are the first and last count values of the revolution detection pulses Vθ when the revolution is detected prior to the ignition operation of the first cylinder, respectively. The counter of the CPU counts the revolution detection pulses Vθ generated by the gear sensor 28 from the time when the reference pulse Vs is detected and the revolution detection timer 1 of the CPU measures the time Tn after the revolution detection pulse of "n1(#1)" is detected until the revolution detection pulse of "n2(#1)" is detected. The revolution of the crank shaft is arithmetically operated from the thus measured Tn.

Similarly, the codes "n1(#2)" and "n2(#2)" are the first and last count values of the revolution detection pulses Vθ when the revolution is detected prior to the ignition operation of the second cylinder, respectively. The revolution detection timer 1 of the CPU measures the time Tn after the revolution detection pulse of "n1(#2)" is detected until the revolution detection pulse of "n2(#2)" is detected. The revolution of the crank shaft is arithmetically operated from the thus measured Tn.

As shown in the time chart of FIG. 4, supposed that the rotary angle position of the crank shaft when the crank angle sensor 28 outputs the reference pulse Vs is θb [BTDC] and that the angle from the rotary angle position of the crank shaft when the reference pulse Vs is generated to the rotary angle position when the gear sensor 29 generates the first revolution detection pulse Vθ is θ go[deg], the rotary angle position of the crank shaft when the count value of the output pulses of the gear sensor 29 reaches n count is given by the following expression;

$$\theta C = \theta b - \theta go - (n-1)(360/60)[BTDC] \quad (1)$$

As the time Tn required for the engine to rotate from the count value n1 of the output pulses of the gear sensor after the crank angle sensor 29 generates the reference pulse Vs (the rotary angle position of θn1 [BTDC]) to the count value n2 (the rotary angle position of θn2 [BTDC]) is detected, the revolution N(rpm) of the engine can be determined by the following expression;

$$N = \{(Tn \times 360)/(n2-n1)\} \times 10^{-6} \, [rpm] \quad (2)$$

Also, as the time Tn required for the engine to rotate from the position where the output pulses of the gear sensor reach the count value n1 to the position where they reach the count value n2 can be detected, the quantity of variation ΔθC [deg] in the rotary angle position of the crank shaft when a predetermined time t [μsec] elapses can be determined by the following expression;

$$\Delta\theta C = (t/tn)(n2-n1)(360/60) \, [deg] \quad (3)$$

In FIG. 3, "n3" designates the count number of the rotary angle detection pulses providing the ignition reference position where the ignition position starts to be measured. Thus, the code "n3(#1)" means n3(#1) counts of the rotary angle detection pulse providing the ignition reference position where the first cylinder ignition position begins to be measured after the reference voltage Vs is generated and "n3(#2)" means n3(#2) counts of the rotary angle detection pulse providing the ignition reference position where the second cylinder ignition position begins to be measured after the reference voltage Vs is generated.

The CPU 40 sets the count value Ti for measuring the arithmetically operated ignition position to the ignition position control timer 2 when the rotary angle detection pulse of n3(#1) counts is detected to start the measurement of the count value and when the ignition position control timer 2 ends to count the set count value, the ignition pulse Vi1 is applied to the CDI ignition circuit for the first cylinder to ignite it.

Similarly, the CPU 40 sets the count value Ti for measuring the arithmetically operated ignition position to the ignition position control timer 2 when the rotary angle detection pulse of n3(#2) counts is detected to start the measurement of the count value and when the ignition position control timer 2 ends to count the set count value, the ignition pulse Vi2 is applied to the CDI ignition circuit for the second cylinder to ignite it.

In FIG. 3, "n4" designates the count number of the rotary angle detection pulses (the output pulses of the gear sensor) providing the injection reference position where the injection start position at which the fuel starts to be injected to the injector begins to be measured. Thus, the code "n4(#1)" means n4(#1) counts of the rotary angle detection pulse providing the injection reference position where the first cylinder injection start position at which the fuel starts to be injected to the injector for the first cylinder begins to be measured after the reference voltage Vs is generated and the code "n4(#2)" means n4(#2) counts of the rotary angle detection pulse providing the injection reference position where the second cylinder ignition position at which the fuel starts to be injected to the injector for the second cylinder begins to be measured after the reference voltage Vs is generated.

The CPU 40 sets the count value T3 for measuring the arithmetically operated injection start position to the first cylinder injection start position control timer 3 when the rotary angle detection pulse of n4(#1) counts is detected to start the measurement of the count value and when the first cylinder injection start position control timer 3 ends to count the set count value, the first cylinder injection signal Vj1 having the time width Tj1 corresponding to the arithmetically operated injection time is applied to the injection drive circuit 43A for the first cylinder to inject the fuel from the first cylinder injector.

Similarly, the CPU 40 sets the count value T4 for measuring the arithmetically operated injection start position to the second cylinder injection start position control timer 4 when the rotary angle detection pulse of n4(#2) counts is detected to start the measurement of the count value and when the second cylinder injection start position control timer 4 ends to count the set count value, the second cylinder injection signal Vj2 having the time width Tj2 corresponding to the arithmetically operated injection time is applied to the injection drive circuit 43A for the second cylinder to inject the fuel from the second cylinder injector.

When the engine should stop, the stop instruction is applied from the stop switch 36 to the ECU. As the stop instruction is applied, the ECU 40 stops supplying the injection signal to the injector drive circuit 43A to stop injecting the fuel from the first and second cylinder injectors and at the same time stop supplying the ignition pulse to the CDI ignition circuit 42 to stop the ignition operation whereby the engine stops.

The fuel pressure applied to the injectors 3 for the respective cylinders is adjusted by the high pressure regulator 15. The high pressure regulator 15 used in the illustrated fuel injection apparatus comprises the return flow adjustment means driven by the solenoid to change the cross section of the fuel passage of the return pipe 16 through which the fuel is returned as aforementioned. Thus, when the control signal Vp is applied from the ECU 30 to the solenoid to adjust the return flow of the fuel whereby the fuel pressure applied to the injector 3 is kept at a proper adjustment value.

In the illustrated fuel injection apparatus, when the internal combustion engine is being normally operated, the control signal Vp is applied from the CPU 40 to the solenoid of the high pressure regulator 15 so that the desired objective value of the fuel pressure adjusted by the high pressure regulator 15 is equal to the normal operation objective value of the fuel pressure and when the internal combustion engine should stop, the control signal Vp is applied to the solenoid of the high pressure regulator 15 so that the value of the fuel pressure applied to the injector 3 is lowered to the value lower than the normal operation objective value of the fuel pressure whereby lowering the stop fuel pressure is controlled.

In the control of lowering the stop fuel pressure, the fuel pressure applied to the injector is preferably lowered to a convergence value of the fuel pressure equal to the atmospheric pressure when the engine is left at the stop state for a long time. The injection time when the engine starts is arithmetically operated on the fuel pressure lowered by the stop fuel pressure lowering control.

In this manner, as the stop fuel pressure lowering control that allows the value of the fuel pressure to be lowered to the normal operation objective value is made when the internal combustion engine should stop, the fuel pressure applied to the injector 3 when the engine starts in case of the engine again starting immediately after the engine stops can be substantially identical to that in case of the engine again starting after the engine is left at the stop state for a long time. Thus, since the amount of the fuel injection when the engine starts can be always substantially constant, the amount of fuel injection when the engine starts can be prevented from being over or less than the objective value thereof, which can improve the startability of the engine.

There is shown in the flow charts of FIGS. 6 through 14 an example of algorithm of a program practiced by the ECU 30 of the internal combustion engine.

In these flow charts, the timer 1 is the revolution detection timer which serves to measure the time during which the gear sensor generates the revolution detection pulses of predetermined number and the timer 2 is the ignition position control timer which serves to measure the time required for the crank shaft to rotate from the ignition reference position of the respective cylinders to the arithmetically operated ignition position thereof.

The timer 3 is the first cylinder injection control timer which serves to measure the time required for the crank shaft to rotate from the first cylinder injection reference position to the first cylinder injector injection start position and the timer 4 is the second cylinder injection control timer which serves to measure the time required for the crank shaft to rotate from the second cylinder injection reference position to the second cylinder injector injection start position.

Further, the counter 1 is the revolution detection gear sensor counter which counts the revolution detection pulses generated by the gear sensor 29 for determining the particular revolution detection pulses from n1 count to n2 count used for detecting the revolution and the counter 2 is the ignition position control gear sensor counter which counts the output pulses of the gear sensor 29 for determining the revolution detection pulse providing the ignition reference position where the ignition position starts to be measured.

The counter 3 is the first cylinder injection start position control gear sensor counter which counts the output pulses of the gear sensor 29 for determining the revolution detection pulse of n4 (#1) count providing the injection reference position where the injection start position of the first cylinder injector starts to be measured and the counter 4 is the second cylinder injection start position control gear sensor counter which counts the output pulses of the gear sensor 29 for determining the revolution detection pulse of n4 (#2) count providing the injection reference position where the injection start position of the second cylinder injector starts to be measured.

Figure 6:
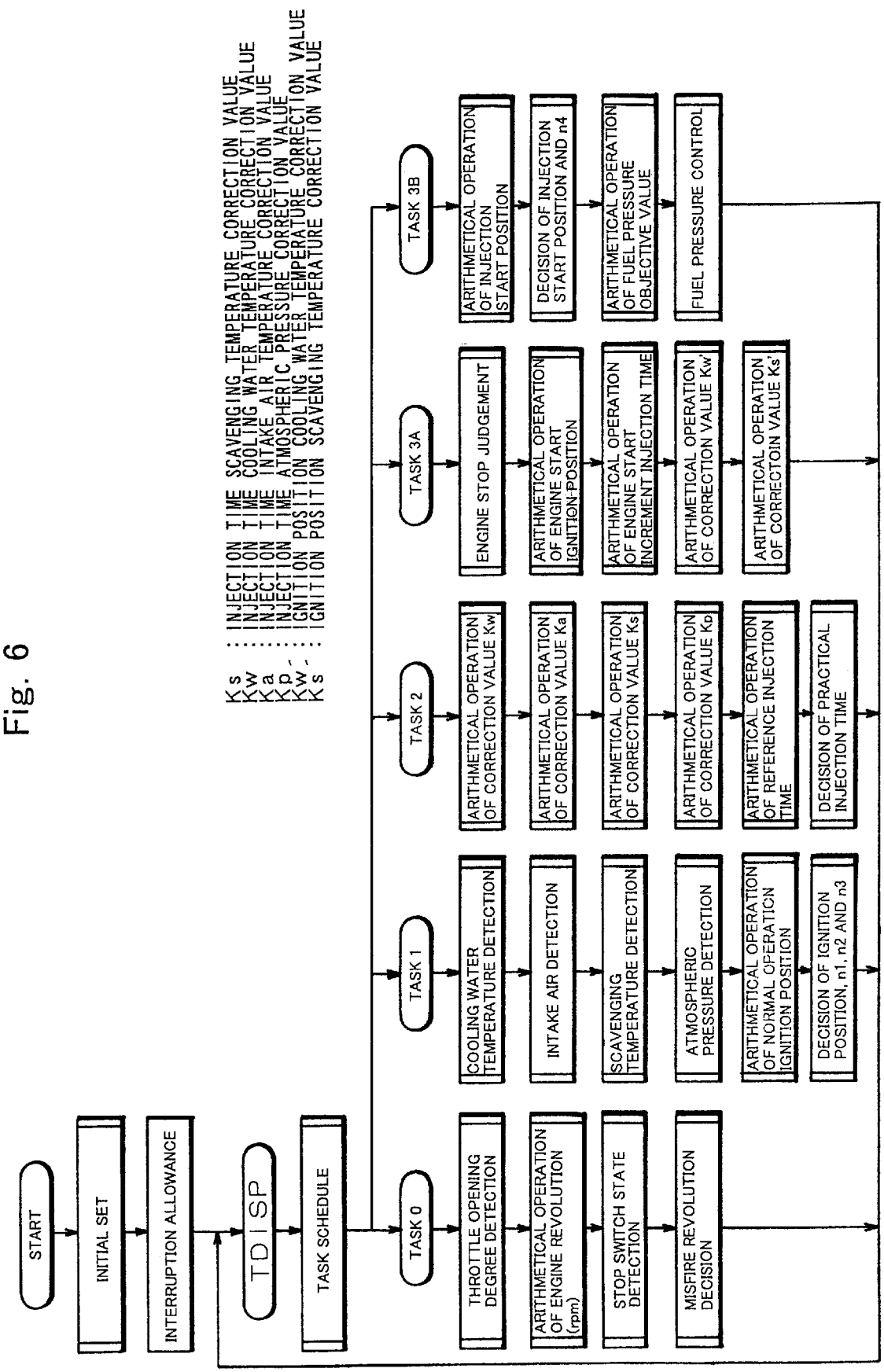
FIG. 6 shows a flowchart illustrating an algorithm of a main routine for a program practiced by a CPU provided in the ECU of the fuel injection apparatus of the invention.
Figure 7:
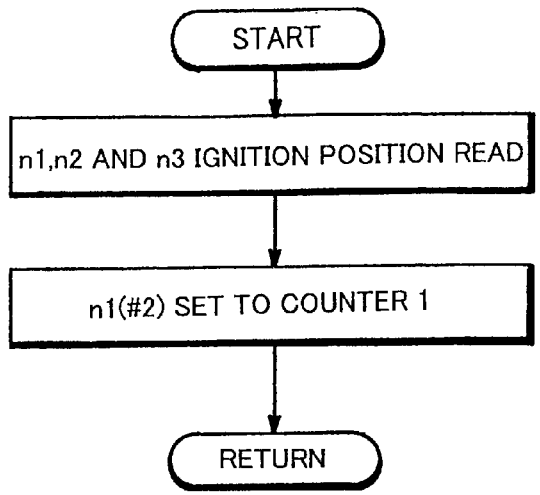
FIG. 7 shows a flowchart illustrating an algorithm of a crank angle sensor interruption routine made when a crank angle sensor for the program practiced by the CPU provided in the ECU of the fuel injection apparatus of the invention generates a reference signal Vs.
Figure 9:
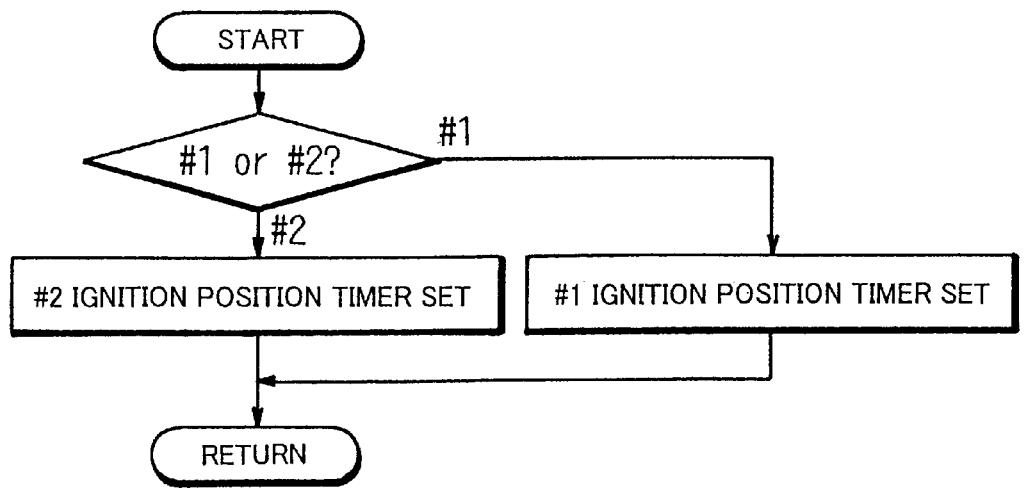
FIG. 9 shows a flowchart illustrating an algorithm of an interruption routine practiced when an ignition position controlling gear sensor counter for the ECU provided in the apparatus of FIG. 1 counts predetermined revolution detection pulses.
Figure 10:
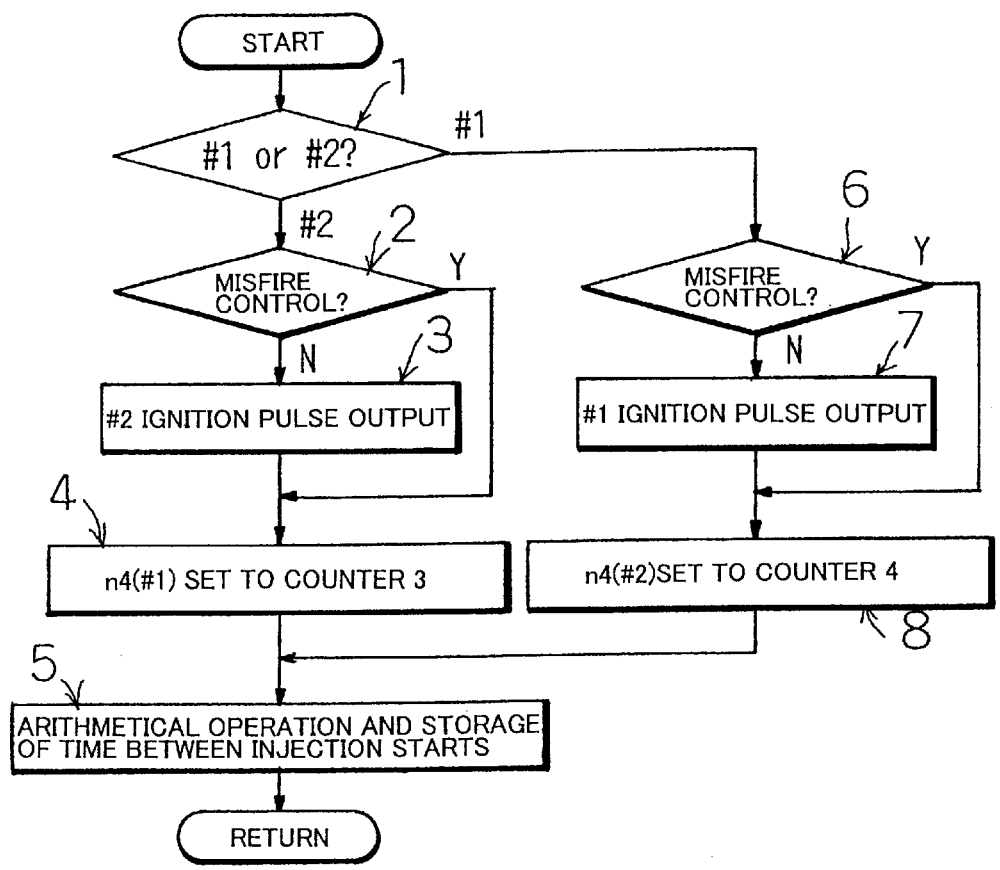
FIG. 10 shows a flowchart illustrating an algorithm of an interruption routine practiced when an ignition position controlling timer for the ECU provided in the apparatus of FIG. 1 measures the ignition position.

FIG. 6 shows a main routine of the program practiced by the CPU 40 and FIG. 7 shows a crank angle sensor interruption routine practiced when the crank angle sensor 28 generates the reference pulse Vs. FIG. 8 shows an interruption routine practiced when the revolution detection counter 1 counts n1 (#2), n2 (#2), n1 (#1) or n2 (#1) and FIG. 9 shows an interruption routine practiced when the ignition position control gear sensor 2 counts n3 (#2) or n3 (#1). FIG. 10 shows an interruption routine practiced when the ignition position control timer 2 measures the ignition position.

Figure 11:
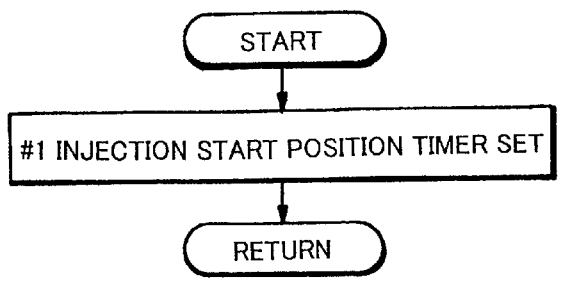
FIG. 11 shows a flowchart illustrating an algorithm of an interruption routine practiced when a first cylinder injection start position controlling counter for the ECU provided in the apparatus of FIG. 1 counts an injection start position for the first cylinder.
Figure 12:
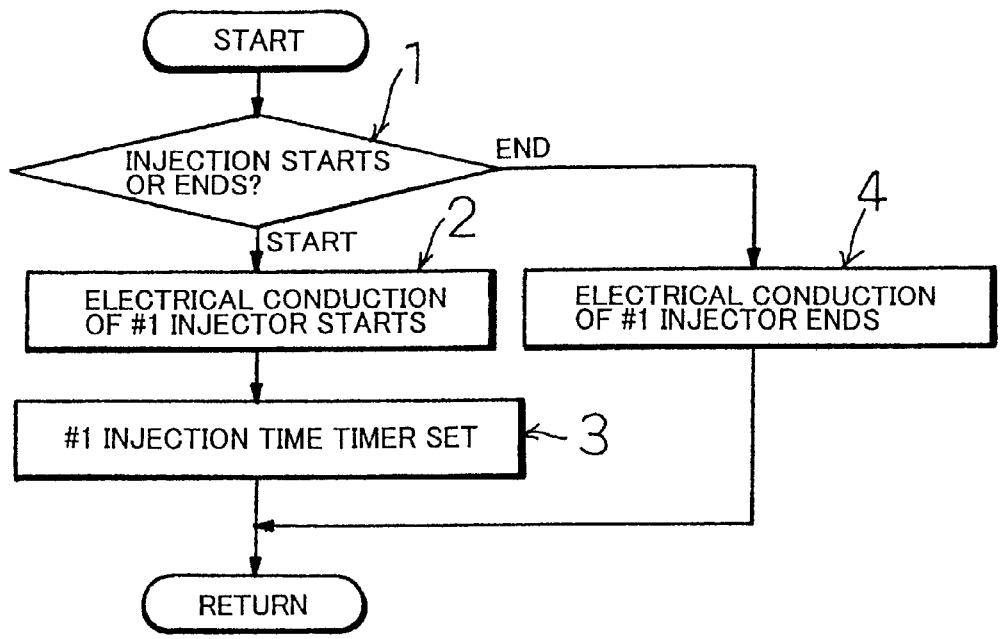
FIG. 12 shows a flowchart illustrating an algorithm of an interruption routine practiced when a first cylinder injection start position controlling timer for the ECU provided in the apparatus of FIG. 1 generates a first cylinder injection signal and when it stops generating the first cylinder injection signal.

FIG. 11 shows an interruption routine practiced when the first cylinder injection start position control gear sensor counter 3 measures the first cylinder injection start position and FIG. 12 shows an interruption routine practiced when the first cylinder injection control timer 3 generates the first cylinder injection signal and stops generating it, respectively.

Figure 13:
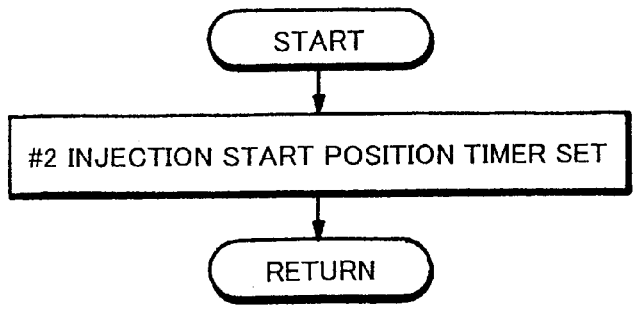
FIG. 13 shows a flowchart illustrating an algorithm of an interruption routine practiced when a second cylinder injection start position controlling counter for the ECU provided in the apparatus of FIG. 1 counts an injection start position for the second cylinder.
Figure 14:
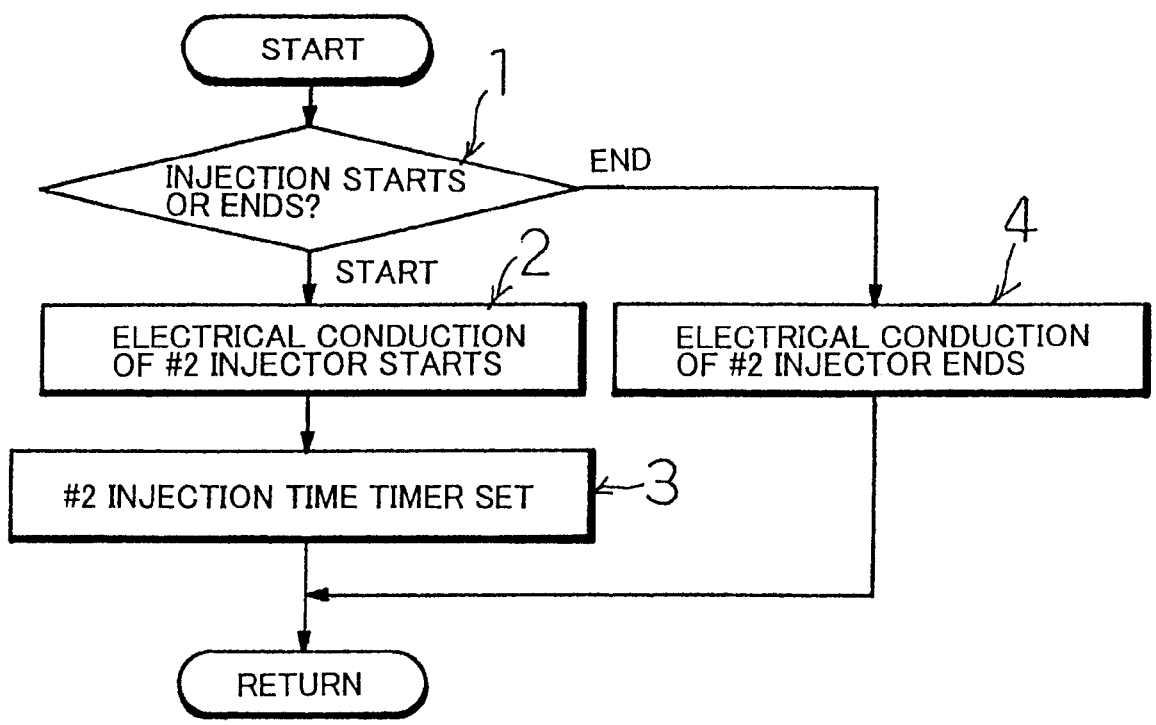
FIG. 14 shows a flowchart illustrating an algorithm of an interruption routine practiced when a second cylinder injection start position controlling timer for the ECU provided in the apparatus of FIG. 1 generates a second cylinder injection signal and when it stops generating the second cylinder injection signal.

FIG. 13 shows an interruption routine practiced when the second cylinder injection start position control gear sensor counter 4 measures the second cylinder injection start position and FIG. 14 shows an interruption routine practiced when the second cylinder injection control timer 4 generates the second cylinder injection signal and when the stops generating it, respectively.

In the main routine of FIG. 6, after the electric power supply for the CPU is established, various portions are initially set and after interruptions are allowed, tasks 0, 1, 2, 3A and 3B are practiced at predetermined time in accordance with the task schedule.

In the task 0, the throttle opening degree is detected from the output of the throttle opening degree sensor and the revolution of the engine is arithmetically operated from the time measured by the timer 1. The state of the stop switch 36 is detected and when the stop instruction is applied, the revolution of the engine at which the engine misfires or fails to be ignited is decided.

In the task 1, the detected values of the cooling water temperature, the intake air temperature and the atmospheric pressure are read from the respective corresponding sensors and the normal operation ignition position is arithmetically operated to decide the ignition position. Also, the count values of n1 (#1), n2 (#1), n1 (#2) and n2 (#2) counted by the counter 1 and the count values of n3 (#1) and n3 (#2) counted by the counter 2 are decided. The normal operation ignition position at various revolutions is arithmetically operated by an interpolation method using an ignition position arithmetical operation map providing the relation between the revolution and the ignition position, for example. A practical ignition position is decided by multiplying the thus arithmetically operated ignition position by a correction value Kw' for the cooling water temperature and a correction value Ks' for the scavenging temperature which will be described later. The ignition position of the respective cylinders is arithmetically operated in the form of the time required for the engine to rotate from the ignition reference position for the respective cylinders to the ignition position which will be referred to as an ignition position measurement time later.

In the task 2, a correction value Kw for the injection time relative to the cooling water temperature (referred to as an injection time cooling water temperature correction value later), a correction value Ka for the injection time relative to the intake air temperature (referred to as injection time intake air temperature correction value later), a correction value Ks for the injection time relative to the scavenging temperature (referred to as injection time scavenging temperature correction value later), a correction value Kp for the injection time relative to the atmospheric pressure (referred to as injection time atmospheric pressure correction value later) and a reference injection time Tijb determined by the revolution of the engine of the engine and the throttle opening degree are arithmetically operated. The practical injection time Ti is arithmetically operated by multiplying the reference injection time Tijb by the correction values Kw, Ka, Ks and Kp and by adding an unavailable injection time Tio peculiar to the injector and a start increment injection time Tis to the product thereof. Thus, it will be noted that the practical injection time Ti can be determined by the following expression. In the expression, the start increment injection time Tis is set for increasing the amount of the fuel when the engine starts and is set at zero except to the engine start.

$$Ti = Tijb \times Kw \times Ka \times Ks \times Kp + Tio + Tis \quad (4)$$

The reference injection time Tijb is used for a basis for determining the practical injection time and can be arithmetically operated by an interpolation method using a three dimensional map providing the relation among the revolution of the engine, the opening degree of the throttle valve and the reference injection time.

The injection time scavenging temperature correction value Ks is peculiarly used in this invention and normally decreases in a gradual manner as the scavenging temperature increases as shown in FIG. 5. The injection time scavenging temperature correction value Ks may be arithmetically operated using an injection time scavenging temperature correction value determining map (a map providing a relation between the correction value Ks as shown in FIG. 5 and the scavenging temperature Ts) stored in a ROM of the CPU. The relation between the scavenging temperature Ts and the correction value Ks can be experimentally decided. Similarly, the other correction values may be arithmetically operated by using maps stored in the ROM.

In the task 3A, whether the engine stops or not is decided and the ignition position when the engine starts, the start increment injection time providing the increment of the amount of the fuel when the engine starts, the correction value Kw' of the ignition position relative to the cooling water temperature and the correction value Ks' of the ignition position relative to the scavenging temperature are arithmetically operated.

In the task 3B, the injection start position is arithmetically operated, the count values n4 (#1) and n4 (#2) of the counter for determining the injection reference position where the injection start position starts to be measured are decided, the objective value of the fuel pressure adjusted by the high pressure regulator 15 is arithmetically operated and the control signal Vp required for obtaining the objective value of the fuel pressure thus arithmetically operated is output so that the fuel pressure is controlled. The objective value of the fuel pressure is determined in accordance with the state of the operation of the engine. When it is judged that the engine stops in the task 3A, the objective value of the fuel pressure is so set as to be equal to the atmospheric pressure. Stop fuel pressure lowering control means to control the pressure regulator 3 so that the value of the fuel pressure applied to the injector is lowered to the value lower than the fuel pressure when the engine is normally operated can be accomplished by the aforementioned fuel pressure control.

The injection start position arithmetically operated in the task 3B may be set either at a constant position relative to the respective cylinders or at a position determined by correcting the reference injection start position set for the respective cylinders in accordance with the scavenging temperature and the cooling water temperature. The correction of the injection start position in accordance with the scavenging temperature and the cooling water temperature may be accomplished by multiplying the reference injection start position by the correction values arithmetically operated in accordance with the scavenging temperature and the cooling water temperature in the same manner as the injection time.

In this embodiment, the interruption routines of FIGS. 7 through 14 are practiced as described hereinafter.

As the crank angle sensor 28 generates the reference pulse Vs, the main routine of FIG. 6 is interrupted and the interruption routine of FIG. 7 is practiced. In the interruption routine of FIG. 7, the count values of n1 (#1), n1 (#2), n2 (#1), n2 (#2), n3 (#1) and n3 (#2) of the pulses stored in the memory 41 are read and the arithmetically operated ignition position is read. Thereafter, n1 (#2) is set at the counter 1 and the operation is returned to the main routine.

When the count value of the counter 1 reaches the set value of n1 (#2), the main routine is interrupted and the interruption routine of FIG. 8 is practiced. In the interruption routine of FIG. 8, at the step 1, whether the count value counted by the counter 1 is n1 or n2 is judged. As the count value of the counter 1 is n1 when the interruption routine of FIG. 8 is firstly practiced after the reference pulse Vs is generated, at the step 2, whether n1 is n1 (#1) or n1 (#2) is judged. As the count value of the counter 1 is n1 (#2) when the interruption routine of FIG. 8 is firstly practiced after the reference pulse Vs is generated, the operation is advanced to the step 3 where n2 (#2) is set at the counter 1. Furthermore, the steps 4 and 5 are practiced and the measurement value of the revolution detection pulse timer 1 is stored in the RAM.

When the count value of the counter 1 reaches n2 (#2), the interruption is again generated so that the interruption routine of FIG. 8 is practiced. Since the count value of the counter 1 is n2 (#2), the operation is advanced to the step 6 where whether n2 is n2 (#1) or n2 (#2) is judged. Since the present count value of the counter 1 is n2 (#2), the operation is advanced to the step 7 where the count value n1 (#1) of the revolution detection pulse when the second detection of the revolution is made is set to the counter 1 and at the step 8, the count value of n3 (#2) providing the second cylinder ignition reference position is set to the ignition position control gear sensor counter 2. Thereafter, at the step 9, the measurement value of the revolution detection timer 1 is read and at the step 10, a difference Tn between the now read measurement value of the timer 1 and the measurement value of the counter 1 read formerly and stored in the RAM is arithmetically operated. Then, at the step 11, the time required for the engine to rotate from the ignition reference position to the ignition position is arithmetically operated and stored in the RAM and the operation is returned to the main routine.

When the count value of the counter 2 reaches n3 (#2), the interruption occurs at the ignition reference position of the second cylinder and the interruption routine of FIG. 9 is practiced. In this interruption routine, whether the present count value is for the first cylinder or for the second cylinder is judged. At present, since the count value n3 of the counter 2 is for the second cylinder, the second cylinder ignition position measurement time Ti2 which is already arithmetically operated from the second cylinder reference position is set to the ignition position control timer 2 and the operation is returned to the main routine.

When the measurement value of the timer 2 reaches the second cylinder ignition position measurement time Ti2, the interruption routine of FIG. 10 is practiced. In this interruption routine, at the step 1, whether the present ignition is the first cylinder ignition or the second cylinder ignition is judged. Since the present ignition is the second cylinder ignition, the operation is advanced to the step 2 where whether misfire control should be made or not is judged. When the misfire is not made, the operation is advanced to the step 3 where the second cylinder ignition pulse is supplied to the second cylinder CDI ignition circuit so that the second cylinder ignition is made.

Then, at the step 4, the count value n4 (#1) of the revolution detection pulse for providing the first cylinder injection reference position is set to the counter 3 and at the step 5, the injection start position measurement time T3 from the injection reference position to the injection start position is arithmetically operated and stored in the RAM. Thus, the operation is returned to the main routine.

When it is judged at the step 2 that the misfire control should be made because the stop switch 36 applies the stop instruction, the step 3 where the ignition pulse is output is not done and the operation is transferred to the step 4.

When the count value of the counter 3 reaches n4 (#1), the interruption routine of FIG. 11 is practiced and the first cylinder injection start measurement time is set to the first cylinder injection control timer 3.

As the measurement count of the timer 3 gets equal to the first cylinder injection start position measurement time, the interruption routine of FIG. 12 is practiced. In this interruption routine, at the step 1, whether the present interruption time is the start or the end of the injection is judged. When it is judged that it is the injection start, at the step 2, the solenoid coil of the first cylinder injector begins to be electrically conducted. Then, at the step 3, the injection time already arithmetically operated is set to the first cylinder injection time timer and the operation is returned to the main routine.

As the measurement value of the timer 3 gets equal to the injection time, the interruption of FIG. 12 again occurs. Since the present interruption time is the end of the injection, the operation is advanced from the step 1 to the step 4 where the first cylinder injector stops being electrically conducted.

As the count value of the counter 1 reaches n1 (#2), the interruption of FIG. 8 occurs. In this interruption, the operation is transferred from the step 2 to the step 12 where the count value of n2 (#1) making the second measurement of the revolution. Thereafter, the steps 4 and 5 are practiced to store the measurement value of the revolution detection timer 1 in the RAM.

As the count value of the counter 1 reaches n2 (#1), the interruption of FIG. 8 again occurs. In this interruption, the operation is advanced to the step 6 where it is judged whether the count value of n2 is for n2 (#1) or n2 (#2). Since the present count value of the counter 1 is n 2(#1), the operation is advanced to the step 13 where the count value of n1 (#2) making the first measurement of the revolution detection pulse is set the counter 1 and at the step 14 the count value of n3 (#1) making the first cylinder ignition reference position is set the ignition position control gear sensor counter 2. Thereafter, the at the step 9, the measurement value of the revolution detection timer 1 is read and at the step 10, a difference Tn between the now read measurement value of the timer 1 and the measurement value of the counter 1 read formerly and stored in the RAM is arithmetically operated. Then, at the step 11, the time required for the engine to rotate from the ignition reference position to the ignition position is arithmetically operated and stored in the RAM and the operation is returned to the main routine.

When the count value of the counter 2 reaches n3 (#1), the interruption occurs at the ignition reference position of the first cylinder and the interruption routine of FIG. 9 is practiced. In this interruption routine, whether the present count value is for the first cylinder or for the second cylinder is judged. At present, since the count value n3 of the counter 2 is for the first cylinder, the first cylinder ignition position measurement time Ti1 which is already arithmetically operated from the first cylinder reference position is set to the ignition position control timer 2 and the operation is returned to the main routine.

When the measurement value of the timer 2 reaches the first cylinder ignition position measurement time Ti1, the interruption routine of FIG. 10 is practiced. In this interruption routine, at the step 1, whether the present ignition is the first cylinder ignition or the second cylinder ignition is judged. Since the present ignition is the first cylinder ignition, the operation is advanced to the step 6 where whether misfire control should be made or not is judged. When the misfire is not made, at the step 7 the first cylinder ignition pulse is supplied to the first cylinder CDI ignition circuit so that the first cylinder ignition is made.

Then, at the step 8, the count value n4 (#2) of the revolution detection pulse for providing the second cylinder injection reference position is set to the counter 4 and at the step 5, the injection start position measurement time T3 from the injection reference position to the injection start position is arithmetically operated and stored in the RAM. Thus, the operation is returned to the main routine.

When it is judged at the step 6 that the misfire control should be made because the stop switch 36 applies the stop instruction, the step 7 where the ignition pulse is output is not done and the operation is transferred to the step 8.

When the count value of the counter 4 reaches n4 (#2), the interruption routine of FIG. 13 is practiced and the second cylinder injection start measurement time is set to the second cylinder injection control timer 4.

As the measurement count of the timer 4 gets equal to the second cylinder injection start position measurement time, the interruption routine of FIG. 14 is practiced. In this interruption routine, at the step 1, whether the present interruption time is the start or the end of the injection is judged. When it is judged that it is the injection start, at the step 2, the solenoid coil of the second cylinder injector begins to be electrically conducted. Then, at the step 3, the injection time already arithmetically operated is set to the second cylinder injection time timer and the operation is returned to the main routine.

As the measurement value of the timer 4 gets equal to the injection time, the interruption of FIG. 14 again occurs. Since the present interruption time is the end of the injection, the operation is advanced from the step 1 to the step 4 where the second cylinder injector stops being electrically conducted The internal combustion engine is operated while a series of operations aforementioned are repeated. In the aforementioned embodiment, the fuel injection apparatus is constructed by the injector 3, the low pressure fuel pump 8, the low pressure regulator 12, the high pressure fuel pump 6, the high pressure regulator 15 and the control unit 30.

Although, in the illustrated embodiment, the electric power voltage is supplied from the magneto generator to the electric power supply circuit 44, it may be supplied from the battery to the electric power supply circuit in the ECU. Although not shown in FIG. 3, the battery 50 may be charged through the charge circuit from the magneto generator 26.

With the injection time corrected by the scavenging temperature that is added to the control conditions, the amount or density of the air supplied into the combustion chamber through the scavenging passage can be accurately estimated. Thus, it will be noted that the injection time or the amount of the fuel required for obtaining a suitable ratio of air to fuel of the mixture gas within the combustion chamber can be positively determined.

Accordingly, the proper ratio of air to fuel of the mixture gas within the combustion chamber can be obtained in spite of the variation in the state of operation of the engine and the environment conditions. Thus, the most suitable combustion can be accomplished and the property of the engine can be improved.

Although, in the illustrated embodiment, the intake air temperature and the cooling water temperature are the control conditions, the control condition of the scavenging temperature can omit the control conditions of the intake air temperature and the cooling water temperature because the density of the air flowing through the scavenging passage within the combustion chamber can be estimated without these temperature. Thus, the practical injection time may be determined by multiplying the reference injection time Tijb only by the injection time atmospheric pressure correction value Kp and the injection time scavenging temperature correction value Ks without the injection time cooling water temperature correction value Kw and the injection time intake air temperature correction value Ka.

According to the invention, since the injection time is corrected by the scavenging temperature which is added to the control conditions for the cylinder direct injection type two cycle internal combustion engine, the density of the air supplied through the scavenging passage within the combustion chamber can be accurately estimated and therefore the injection time of the fuel required for obtaining a suitable ratio of air to fuel of the mixture gas within the combustion chamber can be positively determined.

Accordingly, the proper ratio of air to fuel of the mixture gas within the combustion chamber can be obtained in spite of the variation in the state of operation of the engine and the environment conditions. Thus, the most suitable combustion can be accomplished and the property of the engine can be improved.

Although one preferred embodiment of the invention has been described and illustrated with reference to the accompanying drawings, it will be understood by those skilled in the art that it is by way of example, and that various changes and modifications may be made without departing from the spirit and scope of the invention, which is defined only to the appended claims.

What is claimed is:

1. A fuel injection apparatus for an in-cylinder direct injection type two cycle internal combustion engine comprising an injector provided so as to directly inject a fuel into a cylinder of said two cycle internal combustion engine, a fuel pump to supply said fuel to said injector, a pressure regulator to control a fuel pressure applied from said fuel pump to said injector so as to keep it at a controlled value, a control unit having revolution detection means to detect a revolution of said internal combustion engine, throttle opening degree detection means to detect an opening degree of a throttle valve of said internal combustion engine, various sensors to detect various control conditions including at least an atmospheric pressure, a cooling water temperature and an intake air temperature which are other than said revolution and said opening degree of said throttle valve, reference injection time arithmetical operation means to arithmetically operate a reference injection time which is to be used for a basis for determining a time during which a fuel is injected from said injector relative to said revolution and said opening degree of said throttle valve, correction value arithmetical operation means to arithmetically operate correction values by which said reference injection time is to be multiplied in accordance with said respective control conditions detected by said various sensors in order to correct said injection time relative to said control conditions and practical injection time arithmetical operation means to arithmetically operate a practical injection time by multiplying said reference injection time by said correction values arithmetically operated by said correction value arithmetical operation means in accordance with said control conditions whereby said injector is so controlled as to inject said fuel during the thus determined practical injection time, said fuel injection apparatus further comprising a scavenging temperature detector to detect a scavenging temperature of said two cycle internal combustion engine, wherein said correction value arithmetical operation means is so constructed as to arithmetically operate said injection time while also using said detected scavenging temperature as one of said control conditions.

2. A fuel injection apparatus for an in-cylinder direct injection type two cycle internal combustion engine as set forth in claim 1, wherein said scavenging temperature detector comprises a temperature sensor provided so as to detect a temperature in a scavenging passage of said two cycle internal combustion engine at a position closer to a crank case.

* * * * *